United States Patent Office 3,352,856
Patented Nov. 14, 1967

3,352,856
2-(p-ALKOXYPHENYL)-3-SUBSTITUTED INDOLES
Jacob Szmuszkovicz, Kalamazoo, Mich., assignor to The Upjohn Company, Kalamazoo, Mich., a corporation of Michigan
No Drawing. Filed Dec. 20, 1965, Ser. No. 515,203
16 Claims. (Cl. 260—240)

ABSTRACT OF THE DISCLOSURE

New 2-alkoxyphenyl - 3 - substituted indoles, having sedative and tranquilizing action, of the type

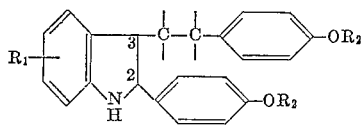

wherein $R_1$ is selected from hydrogen, halogens, alkoxy, and alkyl, having 1 to 3 carbon atoms and $R_2$ is an alkyl having from 1 to 3 carbon atoms, and wherein the group

is selected from

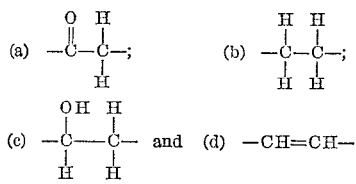

are prepared by reacting a 2-(p-alkoxyphenyl) indole with an alkyl Grignard, then with a p-alkoxyphenyl-acetyl halide to obtain the corresponding p-alkoxybenzyl 2-(p-alkoxyphenyl) indol-3-yl ketone (a) and reducing with lithium hydride or lithium borohydride and if desired acid dehydrating to obtain the compounds with groups (b), (c), and (d) above.

---

This invention relates to novel compounds and is more particularly concerned with central nervous system depressant 2-(p-alkoxyphenyl)-3-substituted indoles (II, III, IV and V), and a process for the production thereof.

The novel products (II, III, IV and V) and a process for the production thereof can be illustratively represented by the following sequence of formulae:

wherein $R_1$ is selected from the group consisting of hydrogen, fluorine, chlorine, bromine, iodine, alkoxy having from 1 to 3 carbon atoms, inclusive, i.e., methoxy, ethoxy, propoxy and isopropoxy, and alkyl having from 1 to 3 carbon atoms, inclusive, i.e., methyl, ethyl, propyl and isopropyl, and wherein $R_2$ is an alkyl group having from 1 to 3 carbon atoms, inclusive.

The process of this invention comprises: Treating a 2-(p-alkoxyphenyl)indole (I) with an alkyl Grignard reagent (e.g., methylmagnesium bromide, ethylmagnesium iodide, butylmagnesium bromide, and the like) and thereupon with a p-alkoxyphenylacetyl chloride or bromide in which the alkoxy group has from 1 to 3 carbon atoms, inclusive, to obtain the corresponding p-alkoxybenzyl 2-(p-alkoxyphenyl)indol-3-yl ketone (II); reducing compound II(A) with lithium aluminum hydride in an ether and decomposing the product to give the corresponding 2-(p-alkoxyphenyl)-3-(p - alkoxyphenethyl)indole (III); (B) with lithium borohydride in an ether and decomposing the product to give α-(p-alkoxybenzyl)-2-(p-alkoxyphenyl)indole-3-methanol (IV) and 2-(p-alkoxyphenyl)-3-(p-alkoxystyryl)indole (V). Compounds of Formula V are also obtained by dehydrating the compounds of Formula IV with acids. Compounds of Formula III can also be obtained by hydrogenating the compounds of Formula V with hydrogen in the presence of a palladium or platinum catalyst. Reduction of compound II with sodium borohydride in ethanol yielded the starting compound of Formula I.

The compounds of Formulae II, III, IV and V of the present invention have a depressant activity on the central nervous system and are thus useful for purposes of sedation and tranquilization in birds and mammals such as domestic pet animals, e.g., dogs and cats and farm animals, e.g., cattle, pigs, sheep, chickens, geese, ducks and the like. Sedation and tranquilization of animals is particularly important during shipments of animals by truck, car, train, airplane, ship and so on, from one location to another to avoid agitation of the animal and thus prevent wounding and even death of the animals during transit. The above compounds II, III, IV and V are also useful for tranquilizing dogs which have lost their owners or undergo a change of ownership as these animals are well-known to refuse water and food during such periods, often for lengthy times, which can endanger their life and their health.

For cases where tranquilization is desired, oral and parenteral dosage forms may be used. The oral forms can be tablets, pills or liquids while the parenteral forms are

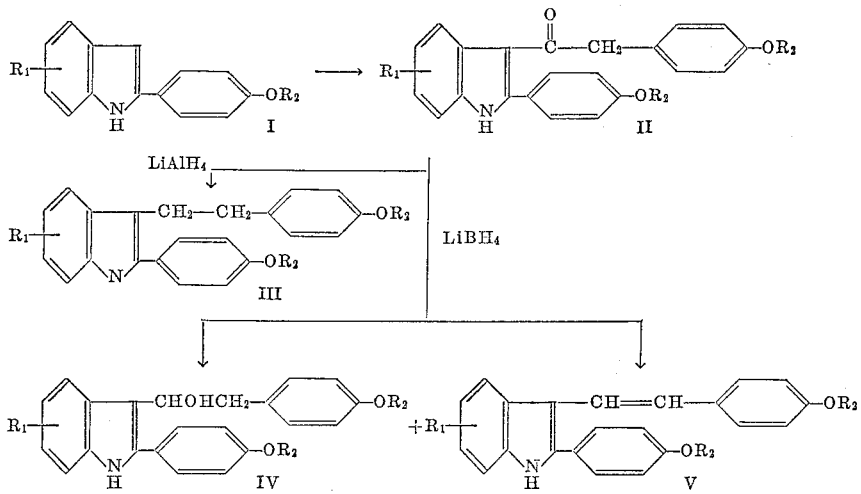

usually applied in the forms of solutions or suspensions. The starting materials of Formula I can be prepared by known methods, e.g., as shown in U.S. Patent 2,825,734 issued Mar. 4, 1958.

In carrying out the process of the present invention, the selected 2-(p-alkoxyphenyl)indole (I) is reacted with an alkylmagnesium halide reagent such as methylmagnesium bromide or methylmagnesium iodide under the usual conditions of Grignard reactions, for example, using benzene, ether, cyclohexane, tetrahydrofuran, and the like as solvents and reacting slowly at about room temperature and finally at elevated temperature, usually at the reflux temperature of the reaction mixture. The thus-obtained reaction mixture is thereupon treated with a p-alkoxyphenylacetyl halide and the reaction mixture is refluxed for a period between a quarter of an hour to three hours. It is then decomposed with water, or preferably aqueous mineral acid such as aqueous hydrochloric, hydrobromic, hydroiodic, sulfuric and other acids. The resulting suspension is filtered, the solids collected and purified by conventional means such as crystallization, recrystallization, trituration, extraction, chromatography and the like to give the corresponding p-alkoxybenzyl 2-(p-alkoxyphenyl)indol-3-yl ketone (II).

The reduction of compound II can be carried out in different manners and depending upon the type of reducing agent and solvent used, different indole compounds are obtained:

(A) *The reduction of p-alkoxybenzyl 2 - (p-alkoxyphenyl)indol-3-yl ketone (II) with lithium aluminum hydride.*—The reduction of p-alkoxybenzyl 2-(p-alkoxyphenyl)indol-3-yl ketone with lithium aluminum hydride is carried out in an ether, such as tetrahydrofuran, diethyl ether, dibutyl ether and the like, preferably in a nitrogen atmosphere, at the reflux temperature of the mixture. The reaction time is usually between one hour and 48 hours. At the termination of the reaction, the mixture is decomposed, for example, by the addition of water and an alkali metal hydroxide, such as aqueous sodium hydroxide, aqueous potassium hydroxide, aqueous lithium hydroxide and the like. The obtained suspension is filtered and the thus-produced solids containing the desired product, a 3 - (p-alkoxyphenethyl)-2-(p-alkoxyphenyl)indole (III) is purified by conventional procedures such as recrystallization, chromatography and combinations thereof.

(B) *The reduction of p-alkoxybenzyl 2 - (p-alkoxyphenyl)indol-3-yl ketone (II) with lithium borohydride.*— The lithium borohydride reduction of p-alkoxybenzyl 2-(p-alkoxyphenyl)indol-3-yl ketone is carried out in an ether such as tetrahydrofuran, diethyl ether, dibutyl ether or the like, at a temperature between 10° and 50° C., usually at room temperature. The reaction time is between one to 48 hours. Room temperature and a reaction time between 15 to 30 hours is a preferred embodiment of this invention. After the reaction is completed, the reaction mixture is decomposed by the addition of water and an alkali metal hydroxide, such as aqueous sodium hydroxide, potassium hydroxide, lithium hydroxide and the like. The resulting suspension is filtered, the filtrate is evaporated and the residue is purified by conventional means such as crystallization, recrystallization, extraction, chromatography and the like, to give two products, namely, α-(p-alkoxybenzyl) - 2 - (p-alkoxyphenyl)indole-3-methanol (IV) and 2-(p-alkoxyphenyl) - 3 - (p-alkoxystyryl)indole (V) which are separated, usually by using the differential solubilities of these products in organic solvents.

(C) *The reduction of p-alkoxybenzyl 2 - (p-alkoxyphenyl)indol-3-yl ketone (II) with sodium borohydride.*— Reduction of p-alkoxybenzyl 2-(p-alkoxyphenyl)indol-3-yl ketone with sodium borohydride in a lower alkanol solution such as ethanol, methanol, propanol, or the like, when carried out at about room temperature results in the production of the corresponding 2-(p-alkoxyphenyl)indole (I).

Alternatively, a 3-(p-alkoxyphenethyl) - 2 - (p-alkoxyphenyl)indole (III) can also be obtained by hydrogenating a 2-(p-alkoxyphenyl)-3-(p-alkoxystyryl)indole (V) in the presence of a palladium catalyst or a platinum catalyst, and an inert solvent such as methanol, ethanol, dioxane, ethyl acetate, and the like.

Alternatively, a 2-(p-alkoxyphenyl)-3-(p-alkoxystyryl) indole (V) can be obtained by dehydration of an α-(p-alkoxybenzyl) - 2 - (p-alkoxyphenyl)indole-3-methanol (IV). The reaction is advantageously performed in an inert solvent such as chloroform, carbon tetrachloride, methylene chloride, and the like, in the presence of a mineral acid such as hydrogen chloride, hydrogen bromide, hydrogen iodide or sulfuric acid diluted in an ether such as diethyl ether or tetrahydrofuran.

The following examples are illustrative of the process and products of the present invention, but are not to be construed as limiting:

EXAMPLE 1

*p-Methoxybenzyl 2-(p-methoxyphenyl)indol-3-yl ketone*

A suspension of 75.2 g. (0.337 mole) of 2-(p-methoxyphenyl)indole in 2 l. of benzene was heated to boiling and then cooled to a temperature of 40 to 50° C. To this mixture was added 114 ml. of a 3 M ether solution of methylmagnesium bromide (0.342 mole). The addition was carried out drop-wise over a period of 30 minutes. The resulting solution was refluxed for a period of 1.5 hours. It was then cooled to room temperature and 62 g. (0.337 mole) of p-methoxyphenylacetyl chloride [see J. Am. Chem. Soc. 76, 1883 (1954)] was added over a period of 20 minutes. The mixture was refluxed for 1.5 hours and allowed to stand for 18 hours. It was then decomposed by the addition of a solution of 85 ml. of concentrated hydrochloric acid in 350 ml. of water. A suspension resulted, which was filtered, the solids washed with benzene, then with water, providing 13.1 g. of a product melting at 196 to 206° C. This product was crystallized from chloroform to give 4 g. of recovered starting material, 2-(p-methoxyphenyl)indole. The filtrate obtained above was separated into two layers. The organic layer was washed with water, then with a saturated sodium chloride solution, then dried by passing it through anhydrous sodium sulfate. The dried solution was evaporated, providing a colored solid which was triturated with ether and the mixture was filtered. The resulting solid was crystallized from ethanol, giving p-methoxybenzyl 2-(p-methoxyphenyl)indol-3-yl ketone in two crops, 31.5 g. melting at 170 to 171.5° C. and 14 g. melting at 168 to 171° C., a total yield of 36 percent. An analytical sample of this compound obtained by recrystallization from ethanol melted at 170.5 to 171.5° C.

*Analysis.*—Calcd. for $C_{24}H_{21}NO_3$: C, 77.60; H, 5.70; N, 3.77. Found: C, 77.28; H, 5.92; N, 3.88.

EXAMPLE 2

*p-Ethoxybenzyl-2-(p-ethoxyphenyl)-5-fluoroindol-3-yl ketone*

In the manner given in Example 1, 2-(p-ethoxyphenyl)-5-fluoroindole was treated first with methylmagnesium bromide and then with p-ethoxyphenylacetyl chloride to give p-ethoxybenzyl 2-(p-ethoxyphenyl)-5-fluoroindol-3-yl ketone.

EXAMPLE 3

*p-Methoxybenzyl 2-(p-methoxyphenyl)-7-chloroindol-3-yl ketone*

In the manner given in Example 1, 2-(p-methoxyphenyl)-7-chloroindole was treated first with methylmagnesium bromide and then with p-methoxyphenylacetyl chloride to give p-methoxybenzyl 2-(p-methoxyphenyl)-7-chloroindol-3-yl ketone.

EXAMPLE 4

*p-Ethoxybenzyl 2-(p-ethoxyphenyl)-7-bromoindol-3-yl ketone*

In the manner given in Example 1, 2-(p-ethoxyphenyl)-7-bromoindole was treated first with methylmagnesium bromide and then with p-ethoxyphenylacetyl chloride to give p-ethoxybenzyl 2-(p-ethoxyphenyl)-7-bromoindol-3-yl ketone.

EXAMPLE 5

*p-Methoxybenzyl 2-(p-ethoxyphenyl)-7-iodoindol-3-yl ketone*

In the manner given in Example 1, 2-(p-methoxyphenyl)-7-iodoindole was treated first with methylmagnesium bromide and then with p-methoxyphenylacetyl chloride to give p-methoxybenzyl 2-(p-methoxyphenyl)-7-iodoindol-3-yl ketone.

EXAMPLE 6

*p-Methoxybenzyl 2-(p-methoxyphenyl)-4-methoxyindol-3-yl ketone*

In the manner given in Example 1, 2-(p-methoxyphenyl)-4-methoxyindole was treated first with methylmagnesium bromide and then with p-methoxyphenylacetyl chloride to give p-methoxybenzyl 2-(p-methoxyphenyl)-4-methoxyindol-3-yl ketone.

EXAMPLE 7

*p-Propoxybenzyl 2-(p-propoxyphenyl)-6-ethoxyindol-3-yl ketone*

In the manner given in Example 1, 2-(p-propoxyphenyl)-6-ethoxyindole was treated first with methylmagnesium bromide and then with p-propoxyphenylacetyl chloride to give p-propoxybenzyl 2-(p-propoxyphenyl)-6-ethoxyindol-3-yl ketone.

EXAMPLE 8

*p-Ethoxybenzyl 2-(p-ethoxyphenyl)-5-propoxyindol-3-yl ketone*

In the manner given in Example 1, 2-(p-ethoxyphenyl)-5-propoxyindole was treated first with methylmagnesium bromide and then with p-ethoxyphenylacetyl chloride to give p-ethoxybenzyl 2-(p-ethoxyphenyl)-5-propoxyindol-3-yl ketone.

EXAMPLE 9

*p-Methoxybenzyl 2-(p-methoxyphenyl)-4-methylindol-3-yl ketone*

In the manner given in Example 1, 2-(p-methoxyphenyl)-4-methylindole was treated first with methylmagnesium bromide and then with p-methoxyphenylacetyl chloride to give p-methoxybenzyl 2-(p-methoxyphenyl)-4-methylindol-3-yl ketone.

EXAMPLE 10

*p-Methoxybenzyl 2-(p-methoxyphenyl)-5-propylindol-3-yl ketone*

In the manner given in Example 1, 2-(p-methoxyphenyl)-5-propylindole was treated first with methylmagnesium bromide and then with p-methoxyphenylacetyl chloride to give p-methoxybenzyl 2-(p-methoxyphenyl)-5-propylindol-3-yl ketone.

EXAMPLE 11

*p-Methoxybenzyl 2-(p-methoxyphenyl)-5-ethylindol-3-yl ketone*

In the manner given in Example 1, 2-(p-methoxyphenyl)-5-ethylindole was treated first with methylmagnesium bromide and then with p-methoxyphenylacetyl chloride to give p-methoxybenzyl 2-(p-methoxyphenyl)-5-ethylindol-3-yl ketone.

EXAMPLE 12

*p-Ethoxybenzyl 2-(p-ethoxyphenyl)-6-methylindol-3-yl ketone*

In the manner given in Example 1, 2-(p-ethoxyphenyl)-6-methylindole was treated first with methylmagnesium bromide and then with p-ethoxyphenylacetyl chloride to give p-ethoxybenzyl 2-(p-ethoxyphenyl)-6-methylindol-3-yl ketone.

EXAMPLE 13

*p-Methoxybenzyl 2-(p-methoxyphenyl)-6-chloroindol-3-yl ketone*

In the manner given in Example 1, 2-(p-methoxyphenyl)-6-chloroindole was treated first with methylmagnesium bromide and then with p-methoxyphenylacetyl chloride to give p-methoxybenzyl 2-(p-methoxyphenyl)-6-chloroindol-3-yl ketone.

EXAMPLE 14

*p-Methoxybenzyl 2-(p-methoxyphenyl)-7-methoxyindol-3-yl ketone*

In the manner given in Example 1, 2-(p-methoxyphenyl)-7-methoxyindole was treated first with methylmagnesium bromide and then with p-methoxyphenylacetyl chloride to give p-methoxybenzyl 2-(p-methoxyphenyl)-7-methoxyindol-3-yl ketone.

EXAMPLE 15

*p-Methoxybenzyl 2-(p-methoxyphenyl)-4-iodoindol-3-yl ketone*

In the manner given in Example 1, 2-(p-methoxyphenyl)-4-iodoindole was treated first with methylmagnesium bromide and then with p-methoxyphenylacetyl chloride to give p-methoxybenzyl 2-(p-methoxyphenyl)-4-iodoindol-3-yl ketone.

In the same manner given in Example 1, other p-alkoxybenzyl 2-(p-alkoxyphenyl)indol-3-yl ketones are prepared by reacting a selected 2-(p-alkoxyphenyl)indole first with methylmagnesium halide and then with a selected p-alkoxyphenylacetyl halide. Representative p-alkoxybenzyl 2-(p-alkoxyphenyl)indol-3-yl ketones thus obtained include:

p-ethoxybenzyl 2-(p-ethoxyphenyl)-6-chloroindol-3-yl ketone;
p-methoxybenzyl 2-(p-methoxyphenyl)-6-fluoroindol-3-yl ketone;
p-propoxybenzyl 2-(p-propoxyphenyl)-4-bromoindol-3-yl ketone;
p-methoxybenzyl 2-(p-methoxyphenyl)-6-propoxyindol-3-yl ketone;
p-ethoxybenzyl 2-(p-ethoxyphenyl)-7-methylindol-3-yl ketone;
p-propoxybenzyl 2-(p-propoxyphenyl)-7-ethoxyindol-3-yl ketone;
p-propoxybenzyl 2-(p-propoxyphenyl)-5-methylindol-3-yl ketone;
p-methoxybenzyl 2-(p-methoxyphenyl)-5-bromoindol-3-yl ketone;
p-ethoxybenzyl 2-(p-ethoxyphenyl)indol-3-yl ketone;
p-methoxybenzyl 2-(p-methoxyphenyl)-6-iodoindol-3-yl ketone; and the like.

EXAMPLE 16

*3-(p-methoxyphenethyl)-2-(p-methoxyphenyl)indole*

A solution of 37.1 g. (0.1 mole) of p-methoxybenzyl 2-(p-methoxyphenyl)indol-3-yl ketone in 500 ml. of tetrahydrofuran was added to a solution of 37.1 g. of lithium aluminum hydride in 2500 ml. of tetrahydrofuran during a period of 20 minutes in a nitrogen atmosphere. The thus-obtained mixture was refluxed while stirring for a period of 17 hours. It was then cooled in ice and decomposed by successive addition of 37 ml. of water, 37 ml. of aqueous 15 percent sodium hydroxide solution and 111 ml. of water. A suspension was thus obtained, which was filtered, the solids washed with tetrahydrofuran, the washings combined with the filtrate and then evaporated to give 37.8 g. of a brown oil as a residue. This residue was dissolved in 20 ml. of methylene chloride and 50 ml. of 15 percent acetone, 85 percent Skellysolve B hexanes. This solution was chromatographed over 1134 g. of Florisil (anhydrous magnesium silicate). The Florisil-containing column was eluted with a mixture of 15 percent acetone, 85 percent Skellysolve B hexanes; 350 ml. fractions of eluate were collected. Fractions 11 through 17 were combined and evaporated to give 26.5 g. of an oil. This oil was crystallized from ether-petroleum ether to give 15.26 g. (43 percent) of 3-(methoxyphenethyl)-2-(p-methoxyphenyl)indole of melting point 80 to 82° C. After additional crystallization from Skellysolve B hexane-ether, 3-(p-methoxyphenethyl)-2-(p-methoxyphenyl)indole of melting point 78.5 to 80° C. was obtained which remained unchanged after additional recrystallization.

Analysis.—Calcd. for $C_{24}H_{23}NO_2$: C, 80.64; H, 6.49; N, 3.92. Found: C, 80.23; H, 6.01; N, 3.51.

A reduction was undertaken with 3.71 g. of p-methoxybenzyl 2-(p-methoxyphenyl)indol-3-yl ketone in 250 ml. of ethanol in the presence of 3.7 g. of sodium borohydride. The mixture was stirred at room temperature overnight. The resulting solution was evaporated to dryness, decomposed with 100 ml. of water and the solid filtered and washed with water. Crystalliaztion from ethanol gave the starting material of Example 1, 2-methoxyphenyl-indole of melting point 228 to 229° C.

EXAMPLE 17

*3-(p-ethoxyphenethyl)-2-(p-ethoxyphenyl)-5-fluoroindole*

In the manner given in Example 16, p-ethoxybenzyl 2-(p-ethoxyphenyl)-5-fluorindol-3-yl ketone was reduced with lithium aluminum hydride in tetrahydrofuran and the resulting mixture was decomposed with water and aqueous sodium hydroxide to give 3-(p-ethoxyphenethyl)-2-(p-ethoxyphenyl)-5-fluoroindole.

EXAMPLE 18

*3 - (p - methoxyphenethyl) - 2 - (p - methoxyphenyl) - 7 - chloroindole*

In the manner given in Example 16, p-methoxybenzyl 2-(p-methoxyphenyl)-7-chloroindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-7-chloroindole.

EXAMPLE 19

*3-(p-ethoxyphenethyl)-2-(p-ethoxyphenyl)-7-bromoindole*

In the manner given in Example 16, p-ethoxybenzyl 2-(p-ethoxyphenyl)-7-bromoindol-3-yl ketone was reduced with lithium aluminum hydride in tetrahydrofuran and the resulting mixture was decomposed with water and aqueous sodium hydroxide to give 3-(p-ethoxyphenethyl)-2-(p-ethoxyphenyl)-7-bromoindole.

EXAMPLE 20

*3-(p-methoxyphenethyl)-2-(p-methoxyphenyl)-7-iodoindole*

In the manner given in Example 16, p-methoxybenzyl 2-(p-methoxyphenyl)-7-iodoindol-3-yl ketone was reduced with lithium aluminum hydride in tetrahydrofuran and the resulting mixture was decomposed with water and aqueous sodium hydroxide to give 3-(p-ethoxyphenethyl)-ethyl)-2-(p-methoxyphenyl)-7-iodoindole.

EXAMPLE 21

*3-(p-methoxyphenethyl)-2-(p-methoxyphenyl)-4-methoxyindole*

In the manner given in Example 16, p-methoxybenzyl 2-(p-methoxyphenyl)-4-methoxyindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-4-methoxyindole.

EXAMPLE 22

*3-(p-propoxyphenethyl)-2-(p-propoxyphenyl)-6-ethoxyindole*

In the manner given in Example 16, p-propoxybenzyl 2-(p-propoxyphenyl)-6-ethoxyindol-3-yl ketone was reduced with lithium aluminum hydride in tetrahydrofuran and the resulting mixture was decomposed with water and aqueous sodium hydroxide to give 3-(p-propoxyphenethyl)-2-(p-propoxyphenyl)-6-ethoxyindole.

EXAMPLE 23

*3-(ethoxyphenethyl)-2-(p-ethoxyphenyl)-5-propoxyindole*

In the manner given in Example 16, p-ethoxybenzyl 2-(p-ethoxyphenyl-5-propoxyindol-3-yl ketone was reduced with lithium aluminum hydride in tetrahydrofuran and the resulting mixture was decomposed with water and aqueous sodium hydroxide to give 3-(p-ethoxyphenethyl)-2-(p-ethoxyphenyl)-5-propoxyindole.

EXAMPLE 24

*3-(p-methoxyphenethyl)-2-(p-methoxyphenyl)-4-methylindole*

In the manner given in Example 16, p-methoxybenzyl 2-(p-methoxyphenyl)-4-methylindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-4-methylindole.

EXAMPLE 25

*3-(p-methoxyphenethyl)-2-(p-methoxyphenyl)-5-propylindole*

In the manner given in Example 16, p-methoxybenzyl 2-(p-methoxyphenyl)-5-propylindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-5-ethylindole.

EXAMPLE 26

*3-(p-methoxyphenethyl)-2-(p-methoxyphenyl)-5-ethylindole*

In the manner given in Example 16, p-methoxybenzyl 2-(p-ethoxyphenyl) - 5 - methylindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-5-ethylindole.

EXAMPLE 27

*3-(p-ethoxyphenethyl)-2-(p-ethoxyphenyl)-6-methylindole*

In the manner given in Example 16, p-ethoxybenzyl 2-(p-ethoxyphenyl)-5-methylindol-3-yl ketone was reduced with lithium aluminum hydride in tetrahydrofuran and the resulting mixture was decomposed with water and aqueous sodium hydroxide to give 3-(p-ethoxyphenethyl)-2-(p-ethoxyphenyl)-6-methylindole.

EXAMPLE 28

*3-(p-methoxyphenethyl)-2-(p-methoxyphenyl)-6-chloroindole*

In the manner given in Example 16, p-methoxybenzyl 2-(p-methoxy)-6-chloroindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-6-chloroindole.

EXAMPLE 29

*3-(p-methoxyphenethyl)-2-(p-methoxyphenyl)-7-methoxyindole*

In the manner given in Example 16, p-methoxybenzyl 2-(p-methoxyphenyl)-7-methoxyindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-7-methoxyindole.

EXAMPLE 30

*3-(p-methoxyphenethyl)-2-(p-methoxyphenyl)-4-iodoindole*

In the manner given in Example 16, p-methoxybenzyl 2-(p-methoxyphenyl)-4-iodoindol-3-yl ketone was reduced with lithium aluminum hydride in tetrahydrofuran and the resulting mixture was decomposed with water and aqueous sodium hydroxide to give 3-(p-methoxyphenethyl)-2-(p-methoxyphenyl)-4-iodoindole.

In the manner given in Example 16, other 3-(p-alkoxyphenethyl)-2-(p-alkoxyphenyl)indoles can be prepared by reducing selected p-alkoxybenzyl 2 - (p - alkoxyphenyl) indol-3-yl ketones with lithium aluminum hydride in tetrahydrofuran and decomposing the resulting mixture with aqueous sodium hydroxide. Representative 3-(p-alkoxyphenethyl)-2-(p-alkoxyphenyl)indoles thus prepared include: 3 - (p-ethoxyphenethyl) - 2 - (p-ethoxyphenyl - 6 - chloroindole; 3-(p-methoxyphenethyl) - 2 - (p - methoxyphenyl) - 6 - fluoroindole; 3 - (p - propoxyphenethyl)-2-(p-propoxyphenyl) - 4 - bromoindole; 3 - (p - methoxyphenethyl) - 2 - (p - methoxyphenyl) - 6 - propoxyindole; 3 - (p - ethoxyphenethyl) - 2 - (p - ethoxyphenyl) - 7 - methylindole; 3 - (p - propoxyphenethyl) - 2 - (p - propoxyphenyl) - 7 - ethoxyindole; 3 - (p - propoxyphenethyl) - 2 - (p - propoxyphenyl) - 5 - methylindole; 3 - (p-methoxyphenethyl) - 2 - (p - methoxyphenyl) - 5 - bromoindole; 3 - (p - ethoxyphenethyl) - 2 -(p - ethoxyphenyl) indole; 3-(p-methoxyphenethyl) - 2 - (p-methoxyphenyl)-6-indoindole; and the like.

EXAMPLE 31

*α-(p-methoxybenzyl) - 2 - (p - methoxyphenyl)indole - 3-methanol and 2-(p-methoxyphenyl)-3 - (p - methoxystyryl) indole*

A solution of 20.2 g. (0.0545 mole) of p-methoxybenzyl 2-(p-methoxyphenyl)indol-3-yl ketone in 270 ml. of tetrahydrofuran was added to a suspension of 20.2 g. of lithium borohydride in 220 ml. of tetrahydrofuran. The mixture was then stirred at room temperature (about 25° C.) for a period of 18 hours. It was then cooled in ice and decomposed by successive addition of 21 ml. of water, 21 ml. of aqueous 15 percent sodium hydroxide solution and 63 ml. of water. After stirring the mixture for about 30 minutes, the resulting suspension was filtered and the filtrate was evaporated to dryness in vacuo. The thus-obtained residue was stirred with 1 l. of water and 700 ml. of ether. The layers were separated and the aqueous layer was extracted with three 100-ml. fractions of methylene chloride. The ether layer and the methylene chloride extracts were combined, washed with water, then with saturated aqueous sodium chloride and finally dried by passage through anhydrous sodium sulfate. The dried solution was evaporated to give a residue which was crystallized from methanol to give 11.7 g. of α-(p-methoxybenzyl)-2-(p-methoxyphenyl)indole-3-methanol of melting point 143 to 144° C. This material was once more recrystallized from methanol to give 4.6 g. of pure α-(p-methoxybenzyl)-2-(p-methoxyphenyl)indole - 3 - methanol having the same melting point of 143 to 144° C.

*Analysis.*—Calcd. for $C_{24}H_{23}NO_3$: C, 77.19; H, 6.21; N, 3.75. Found: C, 77.39; H, 6.31; N, 3.72.

The methanolic filtrates from above were combined and evaporated to dryness. The residue was dissolved in methylene chloride and chromatographed over 650 g. of Florisil (anhydrous magnesium silicate), eluting with 2 l. of methylene chloride and collecting fractions of 200 ml. Fractions 5 through 9 were combined and evaporated, and the solid was crystallized from methanol to give 8.34 g. (43 percent) of 2-(p-methoxyphenyl) - 3 - (p - methoxystyryl)indole of melting point 142 to 143° C.

*Analysis.*—Calcd. for $C_{24}H_{21}NO_2$: C, 81.10; H, 5.96; N, 3.94. Found: C, 81.08; H, 5.93; N, 3.63.

EXAMPLE 32

*α-(p-Ethoxybenzyl)-2-(p-ethoxyphenyl) - 5 - fluoroindole-3-methanol and 2-(p-ethoxyphenyl)-3-(p-ethoxystyryl)-5-fluoroindole*

In the manner given in Example 31, p-ethoxybenzyl 2-(p-ethoxyphenyl)-5-fluoroindol-3-yl ketone was reduced with lithium borohydride in tetrahydrofuran and subsequently decomposed with dilute aqueous sodium hydroxide solution to give α-(p-ethoxybenzyl)-2-(p-ethoxyphenyl)-5-fluoroindole-3-methanol and 2-(p-ethoxyphenyl)-3-p - ethoxystyryl) - 5 - fluoroindole, which were separated as in Example 31.

EXAMPLE 33

*α-(p-Methoxybenzyl)-2-(p-methoxyphenyl) - 7 - chloroindole-3-methanol and 2-(p-methoxyphenyl)-3 - (p - methoxystyryl)-7-chloroindole*

In the manner given in Example 31, p-methoxybenzyl 2-(p-methoxyphenyl)-7-chloroindol-3-yl ketone was reduced with lithium borohydride in tetrahydrofuran and subsequently decomposed with dilute aqueous sodium hydroxide solution to give α-(p-methoxybenzyl)-2-(p-methoxyphenyl)-7-chloroindole-3 - methanol and 2 - (p - methoxyphenyl)-3-(p-methoxystyryl)-7-chloroindole, which were separated as in Example 31.

EXAMPLE 34

*α-(p-Ethoxybenzyl)-2-(p-ethoxyphenyl)-7 - bromoindole-3-methanol and 2-(p-ethoxyphenyl)-3-(p-ethoxystyryl)-7-bromoindole*

In the manner given in Example 31, p-ethoxybenzyl 2-(p-ethoxyphenyl)-7-bromoindol - 3 - yl ketone was reduced with lithium borohydride in tetrahydrofuran and subsequently decomposed with dilute aqueous sodium hydroxide solution to give α-(p-ethoxybenzyl)-2-(p-ethoxyphenyl)-7-bromoindole-3-methanol and 2-(p-ethoxyphenyl)-3-(p-ethoxystyryl)-7-bromoindole, which were separated as in Example 31.

EXAMPLE 35

*α-(p-Methoxybenzyl)-2-(p - methoxyphenyl) - 7 - iodoindole-3-methanol and 2-(p-methoxyphenyl)-3 - (p - methoxystyryl)-7-iodoindole*

In the manner given in Example 31, p-methoxybenzyl 2-(p-methoxyphenyl)-7-iodoindol - 3 - yl ketone was reduced with lithium borohydride in tetrahydrofuran and subsequently decomposed with dilute aqueous sodium hydroxide solution to give α-(p-methoxybenzyl)-2 - (p - methoxyphenyl)-7-iodoindole-3-methanol and 2-(p-methoxyphenyl)-3-(p-methoxystyryl) - 7 - iodoindole, which were separated as in Example 31.

EXAMPLE 36

α-(*p-Methoxybenzyl*)-2-(*p-methoxyphenyl*)-4 - *methoxyindole-3-methanol and 2-(p-methoxyphenyl)-3-(p - methoxystyryl)-4-methoxyindole*

In the manner given in Example 31, p-methoxybenzyl 2-(p-methoxyphenyl)-4-methoxyindol - 3 - yl ketone was reduced with lithium borohydride in tetrahydrofuran and subsequently decomposed with dilute aqueous sodium hydroxide solution to give α-(p-methoxybenzyl)-2-(p - methoxyphenyl)-4-methoxyindole-3-methanol and 2-(p - methoxyphenyl)-3 - (p - methoxystyryl) - 4 - methoxyindole, which were separated as in Example 31.

EXAMPLE 37

α-(*p-Propoxybenzyl*)-2-(*p-propoxyphenyl*) - 6 - *ethoxyindole-3-methanol and 2-(p-propoxyphenyl)-3 - (p - propoxystyryl)-6-ethoxyindole*

In the manner given in Example 31, p-propoxybenzyl 2-(p-propoxyphenyl)-6-ethoxyindol - 3 - yl ketone was reduced with lithium borohydride in tetrahydrofuran and subsequently decomposed with dilute aqueous sodium hydroxide solution to give α-(p-propoxybenzyl)-2-(p-propoxyphenyl)-6-ethoxyindole-3 - methanol and 2 - (p - propoxyphenyl)-3-(p-propoxystyryl)-6 - ethoxyindole, which were separated as in Example 31.

EXAMPLE 38

α-(*p-Ethoxybenzyl*)-2-(*p - ethoxyphenyl*) - 5 - *propoxyindole-3-methanol and 2-(p-ethoxyphenyl)-3-(p-ethoxystyryl)-5-propoxyindole*

In the manner given in Example 31, p-ethoxybenzyl 2-(p-ethoxyphenyl)-5-propoxyindol - 3 - yl ketone was reduced with lithium borohydride in tetrahydrofuran and subsequently decomposed with dilute aqueous sodium hydroxide solution give α-(p-ethoxybenzyl)-2 - (p - ethoxyphenyl)-5-propoxyindole-3-methanol and 2 - (p - ethoxyphenyl)3-(p-ethoxystyryl)-5-propoxyindole, which were separated as in Example 31.

EXAMPLE 39

α-(*p-Methoxybenzyl*)-2-(*p-methoxyphenyl*)-4 - *methylindole-3-methanol and 2-(p-methoxyphenyl)3-(p-methoxystyryl)-4-methylindole*

In the manner given in Example 31, p-methoxybenzyl 2-(p-methoxyphenyl)-4-methylindol-3-yl ketone was reduced with lithium borohydride in tetrahydrofuran and subsequently decomposed with dilute aqueous sodium hydroxide solution to give α-(p-methoxybenzyl)-2-(p-methoxyphenyl)-4-methylindole-3-methanol and 2 - (p - methoxyphenyl)-3-(p-methoxystyryl)-4-methylindole, which were separated as in Example 31.

EXAMPLE 40

α-(*p-Methoxybenzyl*)-2-(*p-methoxyphenyl*) - 5 - *propylindole-3-methanol and 2-(p-methoxyphenyl)-3-(p-methoxystyryl)-5-propylindole*

In the manner given in Example 31, p-methoxybenzyl 2-(p-methoxyphenyl)-5-propylindol-3-yl ketone was reduced with lithium borohydride in tetrahydrofuran and subsequently decomposed with dilute aqueous sodium hydroxide to give α-(p-methoxybenzyl)-2 - (p - methoxybenzyl)-5-propylindole-3-methanol and 2 - (p - methoxyphenyl)-3-(p-methoxystyryl)-5-propylindole, which were separated as in Example 31.

EXAMPLE 41

α-(*p-Methoxybenzyl*)-2-(*p-methoxyphenyl*) - 5 - *ethylindole-3-methanol and 2-(p-methoxyphenyl) - 3 - (p-methoxystyryl)-5-ethylindole*

In the manner given in Example 31, p-methoxybenzyl 2-(p-methoxyphenyl)-5-ethylindol - 3 - yl ketone was reduced with lithium borohydride in tetrahydrofuran and subsequently decomposed with dilute aqueous sodium hydroxide solution to give α-(p-methoxybenzyl)-2-(p-methoxyphenyl)-5-ethylindole-3-methanol and 2-(p-methoxyphenyl)-3-(p-methoxystyryl)-5-ethylindole, which were separated as in Example 31.

EXAMPLE 42

α-(*p-Ethoxybenzyl*)-2-(*p-ethoxyphenyl*)-6 - *methylindole-3-methanol and 2-(p-ethoxyphenyl)-3-(p-ethoxystyryl)-6-methylindole*

In the manner given in Example 31, p-ethoxybenzyl 2-(p-ethoxyphenyl)-6-methylindol - 3 - yl ketone was reduced with lithium borohydride in tetrahydrofuran and subsequently decomposed with dilute aqueous sodium hydroxide solution to give α-(p-ethoxybenzyl)-2-(p-ethoxyphenyl)-6-methylindole - 3 - methanol and 2 - (p - ethoxyphenyl)3-(p-ethoxystyryl) - 6 - methylindole which were separated as in Example 31.

EXAMPLE 43

α-(*p-Methoxybenzyl*)-2-(*p-methoxyphenyl*) - 6 - *chloroindole-3-methanol and 2-(p-methoxyphenyl)-3-(p-methoxystyryl)-6-chloroindole*

In the manner given in Example 31, p-methoxybenzyl 2-(p-methoxyphenyl)-6-chloroindol-3-yl ketone was reduced with lithium borohydride in tetrahydrofuran and subsequently decomposed with dilute aqueous sodium hydroxide solution to give α-(p-methoxybenzyl)-2-(p-methoxyphenyl)-6-chloroindole-3 - methanol and 2 - (p - methoxyphenyl)-3-(p-methoxystyryl)-6-chloroindole, which were separated as in Example 31.

EXAMPLE 44

α-(*p-Methoxybenzyl*)-2-(*p-methoxyphenyl*)-7 - *methoxyindole-3-methanol and 2-(p-methoxyphenyl)-3-(p-methoxystyryl)-7-methoxyindole*

In the manner given in Example 31, p-methoxybenzyl 2-(p-methoxyphenyl)-7-methoxyindol-3-yl ketone was reduced with lithium borohydride in tetrahydrofuran and subsequently decomposed with dilute aqueous sodium hydroxide solution to give α-(p-methoxybenzyl)-2-(p-methoxyphenyl)-7-methoxyindole-3-methanol and 2-(p-methoxyphenyl)-3-(p - methoxystyryl) - 7 - methoxyindole, which were separated as in Example 31.

EXAMPLE 45

α-(*p-Methoxybenzyl*)-2-(*p - methoxyphenyl*) - 4 - *iodoindole-3-methanol and 2-(p-methoxyphenyl)-3 - (p - methoxystyryl)-4-iodoindole*

In the manner given in Example 31, p-methoxybenzyl 2-(p-methoxyphenyl) - 4 - iodoindol-3-yl ketone was reduced with lithium borohydride in tetrahydrofuran and subsequently decomposed with dilute aqueous sodium hydroxide solution to give α-(p-methoxybenzyl)-2-(p-methoxyphenyl)-4-iodoindole-3-methanol and 2-(p-methoxyphenyl)-3-(p-methoxystyryl) - 4 - iodoindole, which were separated as in Example 31.

In the manner given in Example 31, other α-(p-alkoxybenzyl)-2-(p-alkoxyphenyl)indole-3-methanols and 2-(p-alkoxyphenyl)-3-(p-alkoxystyryl)indoles are obtained by reducing selected p-alkoxybenyl 2-(p-alkoxyphenyl)indol-3-yl ketones with lithium borohydride and decomposing the obtained mixtures with aqueous sodium or potassium hydroxide. Representative compounds thus obtained include:

α-(p-ethoxybenzyl)-2-(p-ethoxyphenyl)-6-chloroindole-3-methanol;
α-(p-methoxybenzyl)-2-(p-methoxyphenyl)-6-fluoroindole-3-methanol;
α-(p-propoxybenzyl)-2-(p-propoxyphenyl)-4-bromoindole-3-methanol;
α-(p-methoxybenzyl)-2-(p-methoxyphenyl)-6-propoxyindole-3-methanol;

α-(p-ethoxybenzyl)-2-(p-ethoxyphenyl)-7-methylindole-3-methanol;
α-(p-propoxybenzyl)-2-(p-propoxyphenyl)-7-ethoxyindole-3-methanol;
α-(p-propoxybenzyl)-2-(p-propoxyphenyl)-5-methylindole-3-methanol;
α-(p-methoxybenzyl)-2-(p-methoxyphenyl)-5-bromoindole-3-methanol;
α-(p-ethoxybenzyl)-2-(p-ethoxyphenyl)indole-3-methanol;
α-(p-methoxybenzyl)-2-(p-methoxyphenyl)-6-iodoindole-3-methanol;
2-(p-ethoxyphenyl)-3-(p-ethoxystyryl)-6-chloroindole;
2-(p-methoxyphenyl)-3-(p-methoxystyryl)-6-fluoroindole;
2-(p-propoxyphenyl)-3-(p-propoxystyryl)-4-bromoindole;
2-(p-methoxyphenyl)-3-(p-methoxystyryl)-6-propoxyindole;
2-(p-ethoxyphenyl)-3-(p-ethoxystyryl)-7-methylindole;
2-(p-propoxyphenyl)-3-(p-propoxystyryl)-7-ethoxyindole;
2-(p-propoxyphenyl)-3-(p-propoxystyryl)-5-methylindole;
2-(p-methoxyphenyl)-3-(p-methoxystyryl)-5-bromoindole;
2-(p-ethoxyphenyl)-3-(p-ethoxystyryl)indole;
2-(p-methoxyphenyl)-3-(p-methoxystyryl)-6-iodoindole, and the like.

EXAMPLE 46

*3-(p-methoxyphenethyl)-2-(p-methoxyphenyl)indole from 2-(p-methoxyphenyl)-3-(p-methoxystyryl)-indole*

A solution of 0.33 g. (0.94 mmole) of 2-(p-methoxyphenyl)-3-(p-methoxystyryl)indole was dissolved in 200 ml. of ethanol and hydrogenated for a period of 30 minutes in the presence of 0.3 g. of a ten percent palladium-on-carbon catalyst, at an initial pressure of 53 pounds of hydrogen and at a temperature of between 24 and 26° C. The obtained mixture was then filtered, the filtrate evaporated to dryness, and the thus-obtained residue was dissolved in methylene chloride. The solution was passed through a column containing 16 g. of Florisil (anhydrous magnesium silicate). Elution with 30 ml. of methylene chloride gave 0.259 g. of crude material which was recrystallized from ether-petroleum ether to give 45 mg. of 3 - (p - methoxyphenethyl) - 2 - (p - methoxyphenyl)indole of melting point 78 to 80° C. and with ultraviolet and infrared spectra in agreement with the material obtained in Example 16.

In the same manner given in Example 46, the styryl indoles obtained in Examples 32 through 45 can be hydrogenated in the presence of a palladium or platinum catalyst to give the 3-(p-alkoxyphenethyl)-2-(p-alkoxyphenyl)indoles of Examples 17 through 30.

EXAMPLE 47

*2-(p-methoxyphenyl)-3-(p-methoxystyryl)indole*

A solution of 0.373 g. (1 mmole) of α-(p-methoxybenzyl)-2-(p-methoxyphenyl)indole-3-methanol in 25 ml. of chloroform was prepared and the solution was allowed to stand for 1 hour at room temperature (about 25° C.). To this solution was then added 1 ml. of 2 N ethereal hydrogen chloride solution. The mixture turned brown and after one minute showed complete absence of the starting material, α-(p-methoxybenzyl)-2-(p-methoxyphenyl)indole-3-methanol. The solution was then evaporated to dryness, the resulting brown material was dissolved in methylene chloride, and the solution was passed through a column containing 5 g. of Florisil (anhydrous magnesium silicate). The column was eluted with 200 ml. of methylene chloride, which was evaporated to give 0.3 g. of crude product. This was crystallized from methanol to give 0.23 g. of 2-(p-methoxyphenyl)-3-(p-methoxystyryl)indole of melting point 142 to 143° C., identical in its ultraviolet and infrared spectra with the material obtained in Example 31.

In the same manner given in Example 47, other α-(p-alkoxybenzyl)-2-(p-alkoxyphenyl)indole-3-methanols can be treated with dilute mineral acids such as hydrogen chloride, hydrogen bromide, hydrogen iodide, dilute sulfuric acid, and the like to give the corresponding 2-(p-alkoxyphenyl)-3-(p-alkoxystyryl)indoles. Particular suitable starting materials for this reaction are the α-(p-alkoxybenzyl)-2-(p-alkoxyphenyl)indole-3-methanols of Examples 32 through 45.

By reacting as in Example 1, a 2-(p-alkoxyphenyl)indole with a methylmagnesium Grignard and the resulting product with a p-alkoxyphenylacetyl chloride in which the alkoxy group of the phenylacetyl chloride is different from that of the indole compound, mixed alkoxy compounds can be obtained such as p-ethoxybenzyl 2-(p-methoxyphenyl)indol-3-yl ketone;
p-propoxybenzyl 2-(p-methoxyphenyl)indol-3-yl ketone;
p-methoxybenzyl 2-(p-propoxyphenyl)indol-3-yl ketone;
p-ethoxybenzyl 2-(p-propoxyphenyl)-7-chloroindol-3-yl ketone;
p-propoxybenzyl 2-(p-methoxyphenyl)-6-chloroindol-3-yl ketone;
p-methoxybenzyl 2-(p-ethoxyphenyl)-4-iodoindol-3-yl ketone;
p-propoxybenzyl 2-(p-methoxyphenyl)-7-methoxyindol-3-yl ketone; and the like.

These p-alkoxybenzyl 2-(p-alkoxyphenyl)indol-3-yl ketones, wherein the alkoxy groups are not alike, can undergo reduction as shown in Examples 16 and 31 to give the corresponding 3 - (p - alkoxyphenethyl) - 2 - (p - alkoxyphenyl)indoles, α-(p-alkoxybenzyl)-2-(p-alkoxyphenyl)indole - 3 - methanols and 2 - (p-alkoxyphenyl) - 3 - (p-alkoxystyryl)indoles in which in each compound the two alkoxy groups are unlike. Representative compounds thus obtained include:

3-(p-ethoxyphenethyl)-2-(p-methoxyphenyl)indole;
3-(p-propoxyphenethyl)-2-(p-methoxyphenyl)indole;
3-(p-methoxyphenethyl)-2-(p-propoxyphenyl)indole;
3-(p-ethoxyphenethyl)-2-(p-proproxyphenyl)-7-chloroindole;
3-(p-propoxyphenethyl)-2-(p-methoxyphenyl)-6-chloroindole;
3-(p-methoxyphenethyl)-2-(p-ethoxyphenyl)-4-iodoindole;
3-(p-propoxyphenethyl)-2-(p-methoxyphenyl)-7-methoxyindole;
3-(p-ethoxyphenethyl)-2-(p-methoxyphenyl)-5-methylindole;
α-(p-ethoxybenzyl)-2-(p-methoxyphenyl)indole-3-methanol;
α-(p-propoxybenzyl)-2-(p-methoxyphenyl)indole-3-methanol;
α-(p-methoxybenzyl)-2-(p-propoxyphenyl)indole-3-methanol;
α-(p-ethoxybenzyl)-2-(p-propoxyphenyl)-7-chloroindole-3-methanol;
α-(p-propoxybenzyl)-2-(p-methoxyphenyl)-6-chloroindole-3-methanol;
α-(p-methoxybenzyl)-2-(p-ethoxyphenyl)-4-iodoindole-3-methanol;
α-(p-propoxybenzyl)-2-(p-methoxyphenyl)-7-methoxyindole-3-methanol;
α-(p-ethoxybenzyl)-2-(p-methoxyphenyl)-5-methylindole-3-methanol;
2-(p-ethoxyphenyl)-3-(p-methoxystyryl)-indole;
2-(p-propoxyphenyl)-3-(p-methoxystyryl)indole;
2-(p-methoxyphenyl)-3-(p-propoxystyryl)indole;
2-(p-ethoxyphenyl)-3-(p-propoxystyryl)-7-chloroindole;
2-(p-propoxyphenyl)-3-(p-methoxystyryl)-6-chloroindole;
2-(p-methoxyphenyl)-3-(p-ethoxystyryl)-4-iodoindole;

2-(p-propoxyphenyl)-3-(p-methoxystyryl)-7-methoxy-indole;
2-(p-ethoxyphenyl)-3-(p-methoxystyryl)-5-methylindole; and the like.

I claim:
1. A p-alkoxybenzyl 2-(p-alkoxyphenyl)indol-3-yl ketone of the formula:

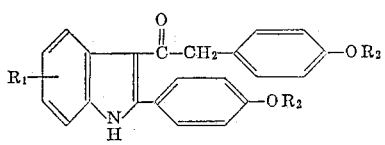

II wherein $R_1$ is selected from the group consisting of hydrogen, fluorine, chlorine, bromine, iodine, alkoxy having from 1 to 3 carbon atoms, inclusive, and alkyl having from 1 to 3 carbon atoms, inclusive, and wherein $R_2$ is an alkyl group having from 1 to 3 carbon atoms, inclusive.

2. The compound according to claim 1, wherein $R_1$ is hydrogen and $R_2$ is methyl, and the compound is therefore p-methoxybenzyl 2-(p-methoxyphenyl)indol-3-yl ketone.

3. The compound according to claim 1, wherein $R_1$ is a 7-chloro substituent and $R_2$ is methyl, and the compound is therefore p-methoxybenzyl 2-(p-methoxyphenyl)-7-chloroindol-3-yl ketone.

4. The compound according to claim 1, wherein $R_1$ is a 7-bromo substituent and $R_2$ is ethyl, and the compound is therefore p-ethoxybenzyl 2-(p-ethoxyphenyl)-7-bromo-indol-3-yl ketone.

5. A 3-(p-alkoxyphenethyl)-2-(p-alkoxyphenyl)indole of the formula:

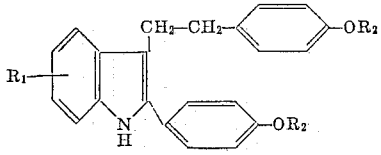

III wherein $R_1$ is selected from the group consisting of hydrogen, fluorine, chlorine, bromine, iodine, alkoxy having from 1 to 3 carbon atoms, inclusive, and alkyl having from 1 to 3 carbon atoms, inclusive, and wherein $R_2$ is an alkyl group having from 1 to 3 carbon atoms, inclusive.

6. The compound according to claim 5, wherein $R_1$ is hydrogen and $R_2$ is methyl, and the compound is therefore 3-(p-methoxyphenethyl) - 2 - (p - methoxyphenyl) indole.

7. The compound according to claim 5, wherein $R_1$ is a 7-chloro substituent and $R_2$ is methyl, and the compound is therefore 3-(methoxyphenethyl)-2-(p-methoxyphenyl)-7-chloroindole.

8. The compound according to claim 5, wherein $R_1$ is a 7-bromo substituent and $R_2$ is ethyl, and the compound is therefore 3-(p-ethoxyphenethyl)-2-(p - ethoxyphenyl) 7-bromoindole.

9. An α-(p-alkoxybenzyl)-2-(p-alkoxyphenyl)indole-3-methanol of the formula:

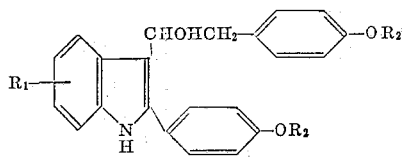

IV wherein $R_1$ is selected from the group consisting of hydrogen, fluorine, chlorine, bromine, iodine, alkoxy having 1 to 3 carbon atoms, inclusive, and alkyl having from 1 to 3 carbon atoms, inclusive, and wherein $R_2$ is an alkyl group having from 1 to 3 carbon atoms, inclusive.

10. The compound according to claim 9, wherein $R_1$ is hydrogen and $R_2$ is methyl, and the compound is therefore α-(p-methoxybenzyl)-2-(p-methoxyphenyl)indole-3-methanol.

11. The compound according to claim 9, wherein $R_1$ is a 7-chloro substituent and $R_2$ is methyl, and the compound is therefore α-(p-methoxybenzyl)-2-(p-methoxyphenyl)-7-chloroindole-3-methanol.

12. The compound according to claim 9, wherein $R_1$ is a 7-bromo substituent and $R_2$ is ethyl, and the compound is therefore α-(p-ethoxybenzyl)-2-(p-ethoxyphenyl)-7-bromoindole-3-methanol.

13. A 2-(p-alkoxyphenyl)-3-(p-alkoxystyryl)indole of the formula:

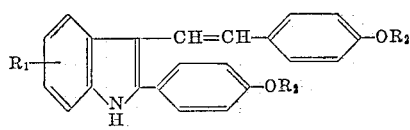

V wherein $R_1$ is selected from the group consisting of hydrogen, fluorine, chlorine, bromine, iodine, alkoxy having 1 to 3 carbon atoms, inclusive, and alkyl having from 1 to 3 carbon atoms, inclusive, and wherein $R_2$ is an alkyl group having from 1 to 3 carbon atoms, inclusive.

14. The compound according to claim 13, wherein $R_1$ is hydrogen and $R_2$ is methyl, and the compound is therefore 2-(p-methoxyphenyl) - 3 - (p - methoxystyryl) indole.

15. The compound according to claim 13, wherein $R_1$ is a 7-chloro substituent and $R_2$ is methyl, and the compound is therefore 2-(p-methoxyphenyl)-3-(p-methoxystyryl)-7-chloroindole.

16. The compound according to claim 13, wherein $R_1$ is a 7-bromo substituent and $R_2$ is ethyl, and the compound is therefore 2-(p-ethoxyphenyl)-3-(p-ethoxystyryl) 7-bromoindole.

References Cited

UNITED STATES PATENTS

| | | | |
|---|---|---|---|
| 2,944,055 | 7/1960 | Anthony | 260—326.15 |
| 2,991,291 | 7/1961 | Szmuszkovicz | 260—326.16 |
| 3,076,814 | 2/1963 | Speeter et al. | 260—326.16 |
| 3,218,333 | 11/1965 | Roozemond | 260—326.15 |

FOREIGN PATENTS

| | | |
|---|---|---|
| 553,622 | 6/1957 | Belgium. |
| 869,775 | 6/1961 | Great Britain. |

OTHER REFERENCES

Fieser et al.: Advanced Organic Chemistry, New York, Reinhold Publishing Corp., 1961, p. 176.

ALEX MAZEL, *Primary Examiner.*

M. U. O'BRIEN, J. A. NARCAVAGE,
*Assistant Examiners.*